US010248581B2

(12) United States Patent
Janssen et al.

(10) Patent No.: US 10,248,581 B2
(45) Date of Patent: *Apr. 2, 2019

(54) GUARDED MEMORY ACCESS IN A MULTI-THREAD SAFE SYSTEM LEVEL MODELING SIMULATION

(71) Applicant: Synopsys, Inc., Mountain View, CA (US)

(72) Inventors: Jan M. J. Janssen, Heerlen (NL); Thorsten H. Grötker, Aachen (DE); Christoph Schumacher, Aachen (DE); Rainer Leupers, Dorsten (DE)

(73) Assignee: Synopsys, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/729,337

(22) Filed: Oct. 10, 2017

(65) Prior Publication Data

US 2018/0032448 A1 Feb. 1, 2018

Related U.S. Application Data

(63) Continuation of application No. 13/971,041, filed on Aug. 20, 2013, now Pat. No. 9,817,771.

(51) Int. Cl.
*G06F 9/46* (2006.01)
*G06F 12/14* (2006.01)

(52) U.S. Cl.
CPC .................. *G06F 12/1466* (2013.01)

(58) Field of Classification Search
None
See application file for complete search history.

(56) References Cited

U.S. PATENT DOCUMENTS

| 6,466,898 | B1 | 10/2002 | Chan |
| 6,532,509 | B1 | 3/2003 | Wolrich et al. |
| 6,587,906 | B2 | 7/2003 | Wolrich et al. |
| 7,313,794 | B1 | 12/2007 | Ansari |
| 7,533,375 | B2 | 5/2009 | Shibayama et al. |
| 8,136,111 | B2 | 3/2012 | Mall et al. |

(Continued)

OTHER PUBLICATIONS

Mello et al., "Parallel Simulation of SystemC TLM 2.0 Compliant MPSoC on SMP Workstations", IEEE, 2010, pp. 1-4.

(Continued)

*Primary Examiner* — Kenneth Tang
(74) *Attorney, Agent, or Firm* — Fenwick & West LLP

(57) ABSTRACT

Methods, systems, and machine readable medium for multi-thread safe system level modeling simulation (SLMS) of a target system on a host system. An example of a SLMS is a SYSTEMC simulation. During the SLMS, SLMS processes are executed in parallel via a plurality of threads. SLMS processes represent functional behaviors of components within the target system, such as functional behaviors of processor cores. Deferred execution may be used to defer execution of operations of SLMS processes that access a shared resource. Multi-thread safe direct memory interface (DMI) access may be used by a SLMS process to access a region of the memory in a multi-thread safe manner. Access to regions of the memory may also be guarded if they are at risk of being in a transient state when being accessed by more than one SLMS process.

15 Claims, 13 Drawing Sheets

(56) References Cited

U.S. PATENT DOCUMENTS

| | | | |
|---|---|---|---|
| 8,813,085 | B2 | 8/2014 | Glew et al. |
| 8,849,644 | B2 | 9/2014 | Tan et al. |
| 9,075,666 | B2 | 7/2015 | Janssen et al. |
| 9,201,708 | B2 | 12/2015 | Janssen et al. |
| 9,817,771 | B2* | 11/2017 | Janssen ............... G06F 12/1466 |
| 2005/0154573 | A1 | 7/2005 | Maly et al. |
| 2007/0198792 | A1 | 8/2007 | Dice et al. |
| 2009/0150898 | A1 | 6/2009 | Sohn et al. |
| 2011/0035204 | A1* | 2/2011 | Smirnov ............... G06F 17/505 703/14 |
| 2011/0170478 | A1 | 7/2011 | Estrada |
| 2012/0036509 | A1 | 2/2012 | Srinivasan et al. |
| 2012/0131124 | A1 | 5/2012 | Frey et al. |
| 2012/0159184 | A1* | 6/2012 | Johnson ............... G06F 21/6218 713/189 |
| 2012/0191441 | A1* | 7/2012 | Wu ............................ G06F 9/52 703/20 |
| 2012/0284473 | A1 | 11/2012 | Hsu et al. |
| 2013/0159587 | A1 | 6/2013 | Nygen et al. |
| 2014/0325516 | A1* | 10/2014 | Ventroux ............... G06F 9/4881 718/102 |
| 2015/0089156 | A1* | 3/2015 | Clohset ...................... G06T 1/60 711/141 |
| 2016/0077979 | A1* | 3/2016 | Lesartre ................. A61B 17/72 711/164 |

OTHER PUBLICATIONS

Boukhechem, S. et al., "TLM Platform Based on SystemC for STARSoC Design Space Exploration," NASA/ESA Conference on Adaptive Hardware and Systems, IEEE, 2008, pp. 354-361.
Chen, W. et al., "ESL Design and Multi-Core Validation Using the System-on-Chip Environment," IEEE, 2010, pp. 142-147.
Chopard, B. et al., "A Conservative Approach to SystemC Parallelization," ICCS 2006, Part IV, LNCS 3994, 2006, V.N. Alexandrov et al. (Eds.), pp. 653-660.
Combes, P. et al., "Relaxing Synchronization in a Parallel SystemC Kernel," 2008 International Symposium on Parallel and Distributed Processing with Applications, IEEE, 2008, pp. 180-187.
Coutu, J., "Reduction of Co-Simulation Runtime Through Parallel Processing," Thesis, University of Saskatchewan, Oct. 2009, 83 pages.
Cox, D. R., "RITSim: Distributed SystemC Simulation," Thesis, Rochester Institute of Technology, Aug. 2005, 72 pages.
Engblom, J., "Multicore Pain (and Fain) from a Virtual Platform Perspective (Keynote)," 2009.
Ezudheen, P. et al., "Parallelizing SystemC Kernel for Fast Hardware Simulation on SMP Machines," 2009 ACM/IEEE/SCS 23.sup.rd Workshop on Principles of Advanced and Distributed Simulation, 2009, pp. 80-87.
Funchal, G. et al., "jTLM: an Experimentation Framework for the Simulation of Transaction-Level Models of Systems-on-Chip," EDAA, 2011, 4 pages.
Galiano, V. et al., "A Case Study in Distributing a SystemC Model," IWANN 2009, Part II, LNCS 5518, 2009, S. Omatu et al. (Eds.), pp. 99-106.
Galiano, V. et al., "Distributing SystemC Structures in Parallel Simulations," 2009, 8 pages.
Galiano, V. et al., "Speeding up in Distributed SystemC Simulations," International Symposium on Distributed Computing and Artificial Intelligence 2008 (DCAI 2008), 2009, J.M. Corchado et al. (Eds.), 7 pages.
Hao, Z. et al., "A Parallel Logic Simulation Framework: Study, Implementation, and Performance," SCS, 2010, pp. 1-10.
Huang, K. et al., "Scalably Distributed SystemC Simulation for Embedded Applications," IEEE, 2008, pp. 271-274.
Kaouane, L. et al., "SysCellC: SystemC on Cell," International Conference on Computational Sciences and Its Applications ICCSA 2008, IEEE, 2008, pp. 234-244.
Khaligh, R. S. et al., "A Dynamic Load Balancing Method for Parallel Simulation of Accuracy Adaptive TLMs," Work Funded by German Research Foundation (Deutsche Forschungsgemeinschaft—DFG) under grant Ra-1889/1-1, 2010, 6 pages.
Liao, X. et al., "Improving Performance of SystemC Based Cycle-Level Simulations Using Multicore Platforms," 2009, 1 page.
Meftali, S. et al., "An Optimal Charge Balancing Model for Fast Distributed SystemC Simulation in IP/SoC Design," Proceedings of the 4.sup.th IEEE International Workshop on System-on-Chip for Real-Time Applications (IWSOC'04), 2004, pp. 1-4.
Meftali, S. et al., "Automatic Generation of Geographically Distributed, SystemC Simulation Models for IP/SoC Design," IEEE, 2004, pp. 1496-1498.
Mello, A. et al., "Parallel Simulation of SystemC TLM 2.0 Compliant MPSoC on SMP Workstations," EDAA, 2010, 4 pages.
Nanjundappa, M. et al., "SCGPSim: A Fast SystemC Simulator on GPUs," IEEE, 2010, pp. 149-154.
Pani, D. et al., "A Fast MPI-Based Parallel Framework for Cycle-Accurate HDL Multi-Parametric Simulations," Int. J. High Performance Systems Architecture, 2010, pp. 187-202, vol. 2, Nos. 3/4.
Savoiu, N. et al., "Design for Synthesis, Transform for Simulation: Automatic Transformation of Threading Structures in High-Level System Models," UCI-ICS TR# 01-57, Dec. 18, 2001, 21 pages.
Savoiu, N. et al., "Automated Concurrency Re-Assignment in High Level System Models for Efficient System-Level Simulation," Proceedings of the 2002 Design, Automation and Test in Europe Conference and Exhibition (DATE'02), IEEE, 2002, 7 pages.
Schumacher, C. et al., "LegaSCI: Legacy SystemC Model Integration into Parallel Systemc Simulators," 2013 IEEE 27.sup.th International Symposium on Parallel & Distributed Processing Workshops and PhD Forum, IEEE, 2013, pp. 2188-2193.
Schumacher, C. et al., "parSC: Synchronous Parallel SystemC Simulation on Multi-Core Host Architectures," CODES+ISSS'10, ACM, Oct. 24-29, 2010, pp. 241-246.
Sirowy, S. et al., "Online SystemC Emulation Acceleration," DAC'10, Jun. 13-18, ACM, 2010, pp. 30-35.
Sirowy, S. et al., "Portable SystemC-on-a-Chip," CODES+ISSS'09, ACM, Oct. 11-16, 2009, pp. 21-29.
Su, W.Y., "New Parallel SystemC Simulation Kernel," 2010, 1 page, [Online] [Retrieved on Mar. 26, 2015] Retrieved from the Internet<http://ir.lib.ncku.edu.tw/handle/987654321/116012>.
Thimmapuram, A. et al., "Adapter Based Distributed Simulation of Multiprocessor SoCs Using SystemC," 2011, 10 pages, [Online] [Retrieved on Mar. 26, 2015] Retrieved from the Internet<URL: http://www.design-reuse.com/articles/18368/distributed-simulation-multipr-ocessor-socs-systemc.html>.
Trams, M., "Conservative Distributed Discrete Event Simulation with SystemC Using Explicit Lookahead," Digital Force White Paper, Feb. 14, 2004, 13 pages.
Zhong, R. et al., "An Inter-Core Communication Enabled Multi-Core Simulator Based on SimpleScalar," 21.sup.st International Conference on Advanced Information Networking and Applications Workshops (AINAW'07), 2007, 6 pages.
Ziyu, H. et al., "A Parallel SystemC Environment: ArchSC," 2009 15.sup.th International Conference on Parallel and Distributed Systems, IEEE, 2009, pp. 617-623.
United States Office Action, U.S. Appl. No. 13/971,041, dated Feb. 16, 2017, 11 pages.
United States Office Action, U.S. Appl. No. 13/971,041, dated Aug. 22, 2016, 11 pages.

* cited by examiner

GUARDED MEMORY ACCESS IN A MULTI-THREAD SAFE SYSTEM LEVEL MODELING SIMULATION

CROSS-REFERENCE TO RELATED APPLICATIONS

This application is a continuation application of U.S. application Ser. No. 13/971,041, filed Aug. 20, 2013, now U.S. Pat. No. 9,817,771, which is incorporated by reference herein in its entirety.

BACKGROUND

1. Field of Art

This disclosure relates to the field of system level modeling simulation, for example, SYSTEMC simulation.

2. Description of the Related Art

SYSTEMC is a system level modeling language used for simulating the behavior of a target system, such as a system on chip (SoC). SYSTEMC is approved by the Institute of Electrical and Electronics Engineers (IEEE) Standards Association as IEEE 1666. SYSTEMC allows a system to be described at different levels of abstraction. More specifically, SYSTEMC is a language built in standard C++ by extending the C++ language with the use of class libraries. SYSTEMC addresses the need for a system design and verification language that spans hardware and software. The language is particularly suited to modeling a system's partitioning, to evaluating and verifying the assignment of blocks to either hardware or software implementations, and to architect and measure the interactions between and among functional blocks.

In particular, IEEE Standard (Std.) 1666-2011, Clause 4.2.1.2, third paragraph provides that when the same target system is simulated multiple times using the same stimulus and the same version of the simulator, the SYSTEMC process ordering between different runs should not vary. That is, the execution order of SYSTEMC processes should be reproducible between various runs of the simulation of the target system in order that intermediate and end results are consistent and reproducible from run to run.

Typically, implementation of SYSTEMC simulations is performed in a single-threaded manner. However, the speed of the simulation has suffered when simulating target systems that themselves comprise multiple processor cores. For example, smart phones from year to year are increasingly faster and hold more computation power, and are designed with multiple processor cores for performing various tasks. As a result, the speed of a SYSTEMC simulation on a single processor core further and further lags behind the speed of the actual hardware device that is being simulated.

In order to speed up the implementation of SYSTEMC simulators, the simulation itself may be performed in a multi-threaded manner on a multi-core processing host system that comprises two or more processor cores within a single computing component. For example, multiple processor cores may be placed in a single processor die. Each of the processor cores is configured to act individually for purposes of program instructions. In that manner, by distributing instructions of a program for execution by the multiple processor cores, the speed for executing the program can be greatly increased when compared to executing the program on a single processor core. In particular, one way to speed up a SYSTEMC simulation is by executing multiple runnable SYSTEMC processes concurrently by means of multiple operating system (OS) threads.

However, SYSTEMC by itself is not multi-thread safe, and under IEEE Std. 1666-2011, a reproducible process execution order must be complied with. That is, the reproducibility of the SYSTEMC simulation (SYSTEMC kernel code as well as user code) should be multi-thread safe (MT safe). As such, data races (e.g., simultaneous accesses to shared resources) and other conditions that can affect the reproducibility of a SYSTEMC simulation from one run to the next must be avoided.

A conventional solution for multi-thread safeness is to guard accesses to shared resources with synchronization elements, such as OS mutexes. However, this is costly from a simulation performance perspective. Moreover, this approach by itself does not address SYSTEMC process execution order reproducibility in order to be compliant with the IEEE Std. 1666-2011 standard. It is thus desirable to have a SYSTEMC simulation that is reproducible and MT safe.

SUMMARY

Embodiments of the present disclosure include methods, systems, and machine readable medium for multi-thread safe system level modeling simulation (SLMS) that produces reproducible results. In one embodiment, a SLMS describes a class of simulations that perform simulation using models of components of a target system. A SYSTEMC simulation is one specific example of a SLMS that can benefit from the multi-thread safe principles of the disclosed embodiments. In other embodiments, other event driven simulators in the field of SLMS that utilize multi-threading may also benefit from the multi-thread safe principles disclosed herein.

One embodiment of the present disclosure uses deferred execution to make a SLMS reproducible and multi-thread safe. According to this embodiment, disclosed is a computer implemented method for multi-threaded SLMS of a target system on a host system. The host system may include a plurality of processor cores that are controlled by a plurality of threads (e.g. operating system threads). The method comprises beginning parallel execution of a plurality of SLMS processes via the plurality of threads. The SLMS processes represent functional behaviors of components within the target system. During the parallel execution of the SLMS processes, operations within the SLMS processes that access at least one shared resource within the host system are detected. Also during the parallel execution, one or more of the operations within the SLMS processes that access the at least one shared resource within the host system are deferred until after the parallel execution is completed. The deferred operations may then be executed sequentially.

Another embodiment of the present disclosure enables direct memory interface (DMI) access to be used during a multi-threaded SLMS in a multi-thread safe manner. According to this embodiment, disclosed is a computer implemented method for multi-threaded SLMS of a target system on a host system. The method comprises beginning parallel execution of a plurality of SLMS processes via a plurality of threads. The SLMS processes represent functional behaviors of components within the target system that access a memory of the target system through an interconnect of the target system. During the parallel execution, a request for DMI access to a region of the memory is detected. The request for DMI access is initiated by a requesting SLMS process of the SLMS processes. Responsive to the request for DMI access, the requesting SLMS process is executed in an exclusive execution mode (EEM)

that prevents the requesting SLMS process from executing in parallel with other SLMS processes of the SLMS processes. The DMI access is then granted to the requesting SLMS process responsive to executing the requesting SLMS process in the exclusive execution mode.

A further embodiment of the present disclosure uses guarded memory access to memory regions to make a SLMS multi-thread safe. According to this embodiment, disclosed is a computer implemented method for multi-threaded SLMS of a target system on a host system, the target system having components that access a memory of the target system. The method comprises setting a region of the memory into guarded mode based on operations in a plurality of SLMS processes. The SLMS processes represent functional behaviors of the components of the target system. During parallel execution of the SLMS processes via a plurality of threads, an access to the region of the memory by a SLMS process of the SLMS processes is detected. Responsive to detecting the access to the region of the memory and the region of the memory being in guarded mode, acquiring a guard lock for the region of the memory that allows the SLMS process to access the memory region while preventing other SLMS processes of the SLMS processes from accessing the region of the memory.

BRIEF DESCRIPTION OF THE DRAWINGS

The disclosed embodiments have other advantages and features that will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Computing Machine Architecture

Figure 1:
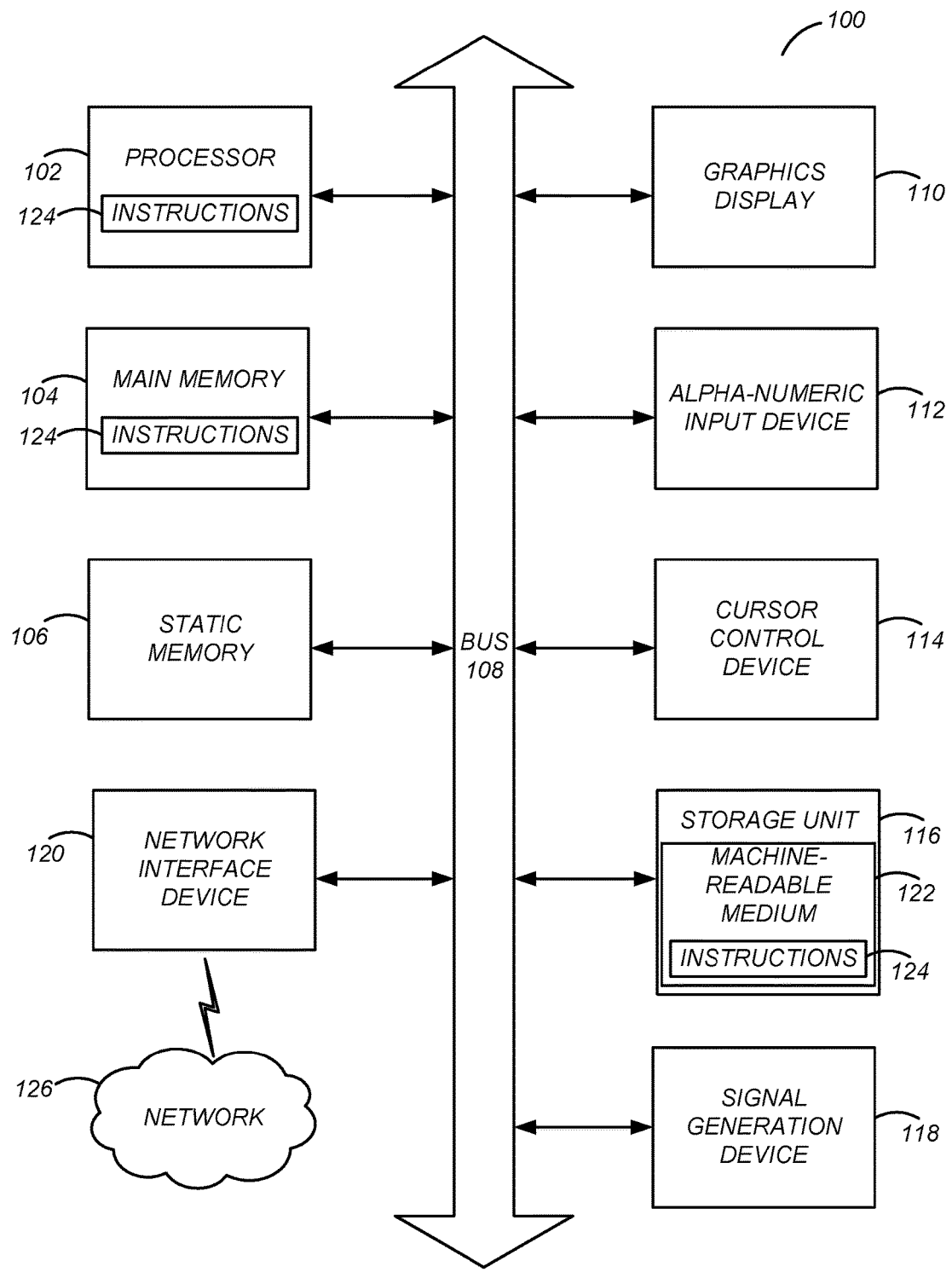
FIG. 1 illustrates one embodiment of components of an example machine able to read instructions from a machine-readable medium and execute them in a processor (or controller).

FIG. 1 is a block diagram illustrating components of an example machine able to read instructions from a machine-readable medium and execute them in a processor (or controller). Specifically, FIG. 1 shows a diagrammatic representation of a machine in the example form of a computer system 100 within which instructions 124 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 124 (sequential or otherwise) that specify actions to be taken by that machine. Further, while only a single machine is illustrated, the term "machine" shall also be taken to include any collection of machines that individually or jointly execute instructions 124 to perform any one or more of the methodologies discussed herein.

The example computer system 100 includes one or more processors 102 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 104, and a static memory 106, which are configured to communicate with each other via a bus 108. The computer system 100 may further include graphics display unit 110 (e.g., a plasma display panel (PDP), a liquid crystal display (LCD), a projector, or a cathode ray tube (CRT)). The computer system 100 may also include alphanumeric input device 112 (e.g., a keyboard), a cursor control device 114 (e.g., a mouse, a trackball, a joystick, a motion sensor, or other pointing instrument), a storage unit 116, a signal generation device 118 (e.g., a speaker), and a network interface device 120, which also are configured to communicate via the bus 108.

The storage unit 116 includes a non-transitory machine-readable medium 122 on which is stored instructions 124 (e.g., software) embodying any one or more of the methodologies or functions described herein. The instructions 124 (e.g., software) may also reside, completely or at least partially, within the main memory 104 or within the processor 102 (e.g., within a processor's cache memory) during execution thereof by the computer system 100, the main memory 104 and the processor 102 also constituting machine-readable media. The computer system 100 includes multiple processor cores that can be distributed across one or more of the processors 102. The instructions 124 (e.g., software) may be transmitted or received over a network 126 via the network interface device 120.

While machine-readable medium 122 is shown in an example embodiment to be a single medium, the term "machine-readable medium" should be taken to include a single medium or multiple media (e.g., a centralized or distributed database, or associated caches and servers) able to store instructions (e.g., instructions 124). The term "machine-readable medium" shall also be taken to include any medium that is capable of storing instructions (e.g., instructions 124) for execution by the machine and that cause the machine to perform any one or more of the methodologies disclosed herein. The term "machine-readable medium" includes, but not be limited to, data repositories in the form of solid-state memories, optical media, and magnetic media.

Deferred Execution

Figure 2:
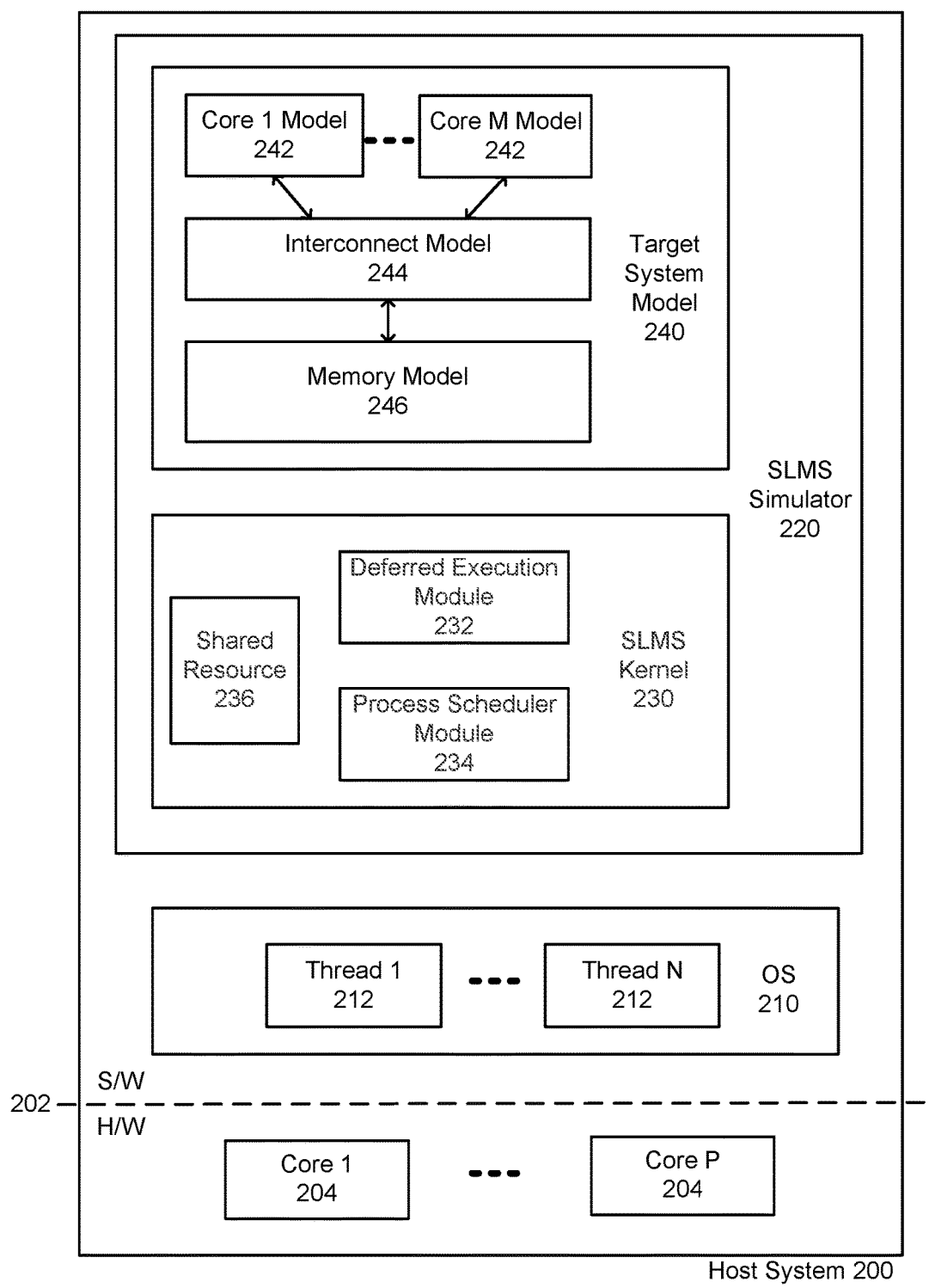
FIG. 2 is a block diagram of a host system configured for performing multi-thread safe system level modeling simulation (SLMS) of a target system using deferred execution, in accordance with an embodiment of the present disclosure.

FIG. 2 is a block diagram of a host system 200 configured for performing multi-thread safe SLMS of a target system using deferred execution, in accordance with an embodiment of the present disclosure. In one embodiment, the host system 200 may be implemented by the computing system 100 of FIG. 1.

The host system 200 can be divided into a hardware layer (H/W) below line 202 and a software layer (S/W) above line 202. The hardware layer H/W includes several processor cores 204. The processor cores may be cores of a central processing unit (CPU), graphics processing unit (GPU), or other type of processor. Additionally, the processor cores 204 may belong to a single processor or may be distributed among several different processors.

The software layer S/W includes an operating system (OS) 210 and a SLMS simulator 220. In one embodiment, the OS 210 and SLMS simulator 220 can be stored as instructions in a machine readable medium of the host system 200. The OS 210 is a collection of software that manages the hardware of the host system 200 and acts as an intermediary between the SLMS simulator 220 and hardware layer H/W of the host system 200. Examples of an OS 210 include ANDROID, LINUX, WINDOWS, and IOS. OS 210 controls the execution of processor cores 204 through multiple OS threads 212. The OS threads 212 can be assigned to different processor cores 204 and executed in parallel by the processor cores 204. In other embodiments the OS 210 may not be present and the SLMS simulator 220 may be responsible for controlling execution of the processor cores 204 through parallel threads.

The SLMS simulator 220 allows verifying the behavior of a target system by performing a multi-threaded simulation of a target system model 240. The target system model 240 is a simulation representation of a physical target system that is to be verified during simulation, such as a SoC or other hardware design. The target system includes components such as processor cores, an interconnect, and a memory. The processor cores are coupled to the interconnect and access the memory through the interconnect. The target system model 240 includes models for the various components of a target system, such as processor core models 242, an interconnect model 244, and a memory model 246. The target system model 240 can also include software (not shown) that is to be executed on the components of the target system. In other embodiments, the target system model 240 may have a different configuration of component models than that shown in FIG. 2.

The SLMS kernel 230 represents the central control logic for a SLMS that schedules and controls execution of the simulation across the OS threads 212, as will be explained herein. In specific, the SLMS kernel 230 can generate SLMS processes, schedule execution of the SLMS processes, and includes functions that are called by the target system model 240 through an application programming interface (API) during a SLMS.

The SLMS kernel 230 generates SLMS processes from the models of the hardware components of the target system model 240 and software inside the target system model 240. A SLMS process is a collection of operations that represent the functional behavior of a component of the target system, as described by the target system model 240. For example, one SLMS process may represent the behavior of processor core 1 and another SLMS process may represent the behavior of processor core M, and these SLMS processes can be generated from the respective core models 242. The SLMS kernel 230 also controls the execution of the SLMS processes across the OS threads 212 during various execution phases as will be described herein.

In an embodiment that uses SYSTEMC, the SLMS process may be a (1) method process or a (2) thread process. A method process behaves like a function and is called upon the occurrence of one or more events. When called, the method process starts executing and returns to the calling mechanism when finished. Method processes support the explicit state machine paradigm. On the other hand, a thread process behaves like an OS thread and is resumed upon the occurrence of one or more events. When resumed, the thread process continues executing and suspends when finished. Thread processes support the implicit state machine paradigm.

Further, in an embodiment that uses SYSTEMC, the SLMS kernel 230 can include a SYSTEMC class library including a public shell consisting of predefined classes, functions, macros, and so forth that are used directly by the target system model 240 during a SYSTEMC simulation. The SLMS kernel 230 also includes a private kernel that implements the core functionality of the class library.

The SLMS kernel 230 includes a process scheduler module 234, a deferred execution module 232, and a shared resource 236. Shared resource 236 represents functionality provided by the SLMS kernel 230 that affects the internal state of the SLMS kernel. The shared resource 236 may be accessed by the SLMS processes through the API of the SLMS kernel 230. Examples of a shared resource 236 in SYSTEMC are the wait( )function, next_trigger( )function, notify( )function, cancel( )function, and sc_stop( )function of the SYSTEMC kernel. Although only one shared resource 236 is shown in FIG. 2, in other embodiments there may be more than one shared resource 236.

Process scheduler module 234 schedules the SLMS processes across multiple OS threads 212 so that the SLMS processes can be executed in parallel, which can increase the speed of the SLMS. The process scheduler module 234 may schedule multiple SLMS processes to each OS thread 212. As the SLMS processes are executed in parallel via the OS threads 212, some operations within the SLMS processes may attempt to access the shared resource 236. Accesses to the shared resource 236 have the potential for causing data races that prevent the simulation results from being reproducible from one simulation run to the next. To prevent data races, the deferred execution module 232 detects operations that attempt to access the shared resource 236 during the parallel phase of execution and defers these operations until they can be executed sequentially during a deferred sequential phase of execution.

The shared resource 236 is shown as being in the SLMS kernel 230, but in other embodiments the shared resource 236 may be located elsewhere in the host system 200. In one embodiment, the shared resource 236 may be a shared functionality within the target system model 240. For example, the shared resource in the target system model 240 can be a state variable within the memory model 246, or a global state variable of the target system model 240. If the shared resource is in the target system model 240, the target system model 240 can be configured to call a function of the deferred execution module 232 when a shared resource of the target system model 240 is being accessed, which provides the deferred execution module 232 with an indication of an access to the shared resource. In another embodiment, the shared resource 236 may be a shared functionality in the OS 210. For example, the shared resource in the OS 210 can be a standard output function of the OS 210 that prints information to standard output. If the shared resource is in the OS 210, the corresponding OS function call can be wrapped such that the target system model 240 calls a function of the deferred execution module 232 when a shared resource of the OS 210 is being accessed, which provides the deferred execution module 232 with an indication of an access to the shared resource.

Figure 3:
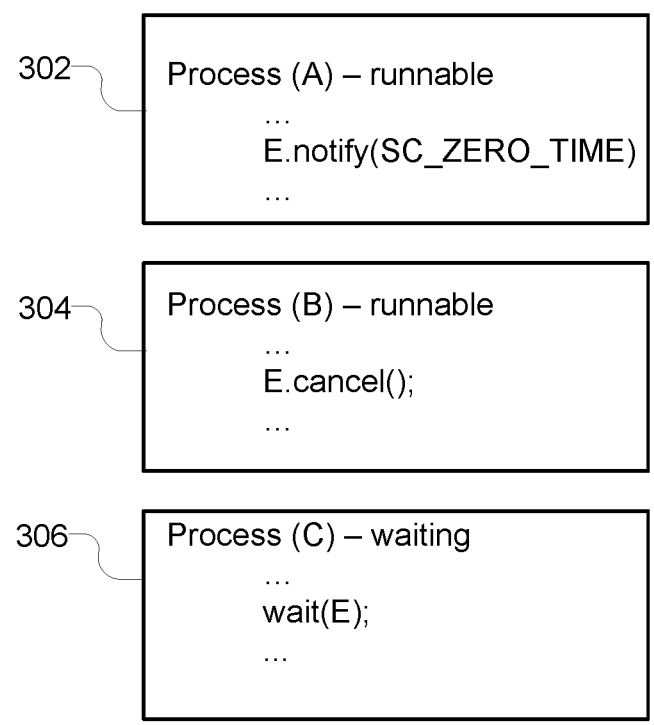
FIG. 3 illustrates an example of three separate SLMS processes that may produce different outcomes depending on their order of execution, in accordance with an embodiment of the present disclosure.

FIG. 3 illustrates an example of three separate SLMS processes that may produce different outcomes depending on their order of execution, in accordance with an embodiment of the present disclosure. As additional background, it is noted that SLMS simulations operate in delta cycles. A delta cycle is a simulation cycle of infinitesimal duration in which the simulation time (i.e. design clock time) at the beginning of the cycle is the same as the simulation time at the end of the cycle. That is, simulation time is not advanced in a delta cycle. In SYSTEMC simulations, each delta cycle includes an evaluation phase during which SYSTEMC processes are executed, an update phase during which SYSTEMC primitive channels are updated, and a notification phase during which it is determined whether any SYSTEMC processes should be executed in the next delta cycle. Other SLMS simulations may include other phases or a different ordering of phases in a delta cycle.

As shown in FIG. 3, there are three different SLMS processes that can be scheduled across the OS threads: SLMS process A 302, SLMS process B 304, and SLMS process C 306. SLMS process A 302 includes an operation of E.notify(SC_ZERO_TIME), which is a delta notification of event E in SYSTEMC terminology. Delta notifications allow triggering of events in subsequent delta cycles. SLMS process B 304 includes an operation of E.cancel( ), which cancels any pending notifications of event E. SLMS process C 306 includes the operation wait(E), which means that SLMS process C 306 waits until event E is triggered before resuming execution.

If SLMS process A 302 is scheduled before SLMS process B 304, SLMS process C 306 will not resume execution in the next delta cycle. That is, SLMS process A 302 schedules a notification of event E for the next delta cycle. However, SLMS process B 304, within the same delta cycle, subsequently cancels any pending notification of event E. In that case, in the next delta cycle event E will not be triggered, and so SLMS process C 306 will not resume execution.

On the other hand, if SLMS process B 304 is scheduled before SLMS process A 302, SLMS process C 306 will resume execution in the next delta cycle. That is, SLMS process B 304 is executed before SLMS process A 302, and acts to cancel any pending notification of event E. Thereafter, SLMS process A 302 is executed within the same delta cycle and schedules a notification of event E for the next delta cycle. In this scenario, the ordering of SLMS process A 302 and SLMS process B 304 is such that event E will be triggered.

When SLMS process A 302 and SLMS process B 304 are scheduled to different OS threads and execute in parallel with each other, there is a potential for a race condition between SLMS process A 302 and SLMS process B 304. During one run of the simulation, SLMS process A 302 may execute before SLMS process B 304, and therefore SLMS process C 306 will not run. During another run of the simulation, SLMS process B 302 may execute before SLMS process A 302, and therefore SLMS process C 306 will run. This behavior is not desirable and causes the output of a multi-threaded SLMS to be unpredictable (i.e., non-reproducible) from one run to the next.

Figure 4:
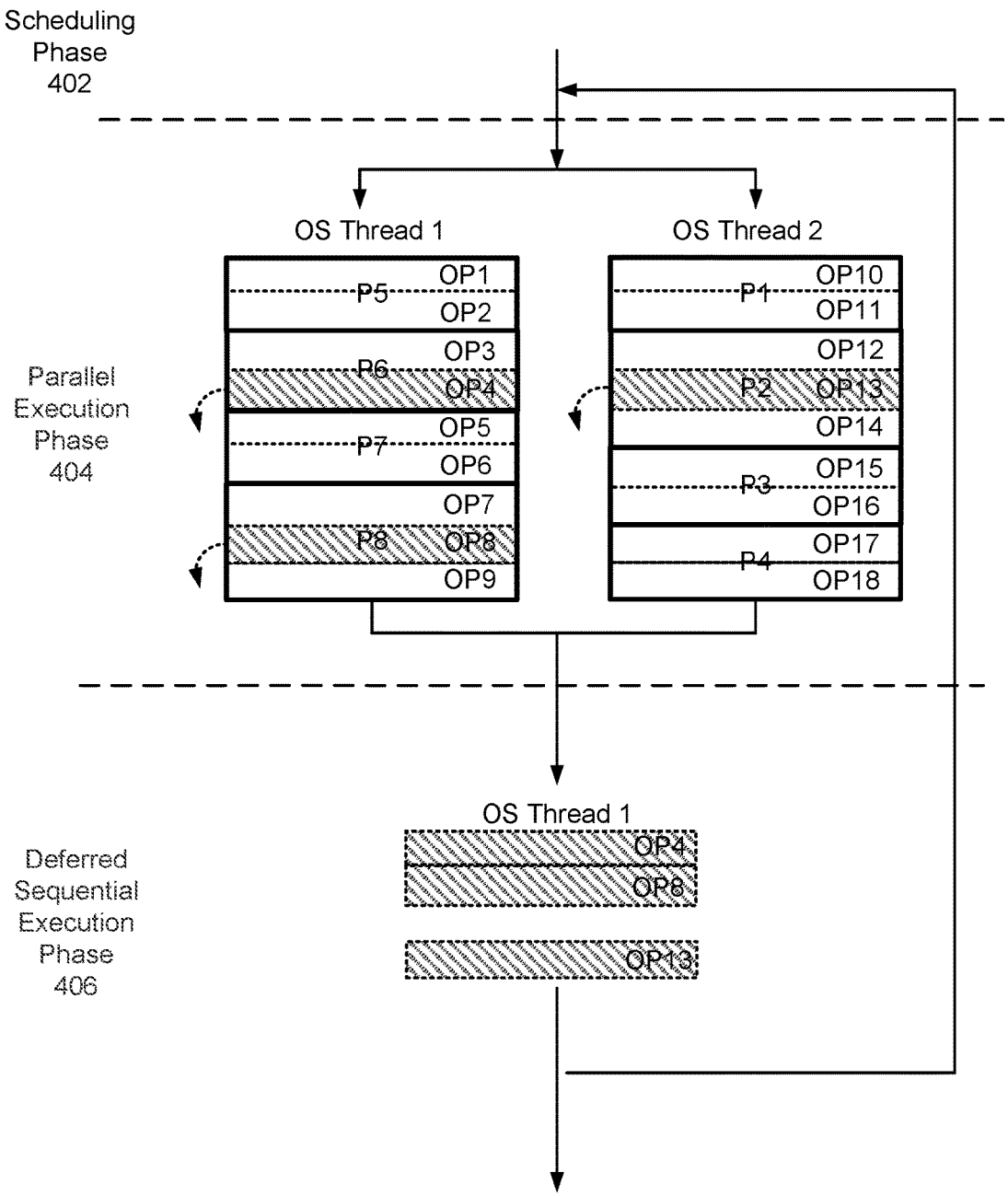
FIG. 4 is a diagram illustrating phases of process execution and the effect of deferred execution on the phases of process execution, in accordance with an embodiment of the present disclosure.

FIG. 4 is a diagram illustrating phases of process execution and the effect of deferred execution on the phases of SLMS, in accordance with an embodiment of the present disclosure. In SYSTEMC terms, the execution phases of FIG. 4 can all occur within a single evaluation phase of a delta cycle and can be viewed as sub-phases of the evaluation phase. The diagram shows three different execution phases during the SLMS: a scheduling phase 402, a parallel execution phase 404, and a deferred sequential execution phase 406. During the scheduling phase 402, the process scheduler module 234 schedules SLMS processes across the OS threads 212. As shown, there are eight SLMS processes P1-P8 scheduled across two different OS threads 212. There are a total of eighteen operations OP1-OP18 that form the eight SLMS processes P1-P8.

During the parallel execution phase 404, the SLMS processes begin executing in parallel according to their scheduled order across the OS threads 212. As the SLMS processes are executing in parallel, the execution eventually reaches operations that access a shared resource 236. Operations that access a shared resource 236 are shown with diagonal shading, and include operations OP4, OP8, and OP13. Instead of executing these operations OP4, OP8, and OP13 during the parallel execution phase 404, the execution of these operations is deferred until a later deferred sequential execution phase 406. The operations OP4, OP8, OP13 can be deferred by placing these operations into a deferred execution queue that is assigned to OS Thread 1.

In one embodiment, there may be different types of shared resources 236 and only operations accessing shared resources 236 of some types can be deferred. Deferrable operations are those that still allow for standards-compliant execution if they are not executed immediately, but are executed before the next phase of simulation begins (e.g., for SYSTEMC, prior to the SYSTEMC update phase). Examples of deferrable operations that access a shared resource include operations corresponding to the SYSTEMC functions of wait( ), next_trigger( ), notify( ), cancel( ) and sc_stop( ). Operations accessing these functions can be deferred as these functions do not return a result which is used in subsequent operations of a SLMS process. These functions only affect a later phase of the simulation or a later delta cycle in the simulation.

Non-deferrable operations are those that must be executed immediately to allow for standards-compliant execution. Non-deferrable operations generally include operations that obtain a result used for calculations or decision making during a later operation of the current SLMS process. For instance, if OP8 obtains a result that OP9 depends on to make a decision, OP8 cannot be deferred because OP9 cannot execute unless it has the result from OP8. Examples of non-deferrable operations are operations asking for the current simulation time from the SLMS kernel 230 and operations that create and obtain a handle for a new SLMS process.

In an embodiment where the shared resource 236 is located in the target system model 240, an example of a deferrable operation includes updating the attribute of the target system model 240 that will not be read in the current delta cycle. An example of a non-deferrable operation is updating attributes of the target system model 240 that will be read again in the current delta cycle. In an embodiment where the shared resource 236 is located in the OS 210, an example of a deferrable operation is writing data to a logfile of the OS 210.

In one embodiment, the deferred execution module 232 is pre-configured with knowledge of which shared resources 236 can be accessed in a deferred manner and which shared resources 236 should not be accessed in a deferred manner. If an operation accesses a shared resource 236 that can be accessed in a deferred manner, the deferred execution module 232 defers the operation. If an operation accesses a shared resource 236 that cannot be accessed in a deferred manner, the deferred execution module 23 does not defer the operation. Thus, some operations (i.e. a set of the operations) accessing some shared resources 236 are deferred, and other operations accessing other shared resources 236 are not deferred.

Other operations within a SLMS process that do not access a shared resource are allowed to continue executing. For example, even though operation OP13 of SLMS process P2 is deferred, operation OP14 is executed anyway. Additionally, the remaining SLMS processes are executed until all of the scheduled SLMS processes P1-P8 have been executed. At this point the parallel execution phase 404 is complete and the deferred sequential execution phase 406 begins.

During the deferred sequential execution phase 406, the operations that were deferred (OP4, OP8, OP13) are now executed sequentially. The sequential execution of operations that access a shared resource 236 prevents race conditions and ensures reproducibility of simulation results across different simulation runs. As shown in FIG. 4, in one embodiment the deferred operations are executed by order of the OS threads 212 they were originally scheduled to (e.g., OP4→OP8→OP13). Executing by OS thread order is appropriate when the SLMS processes can be reproducibly scheduled across the OS threads 212 (e.g., SLMS process P2 always scheduled to OS thread 2 and schedule SLMS process P6 always scheduled to OS thread 1).

In another embodiment, the deferred operations are executed in order of the SLMS processes associated with the deferred operations (e.g., OP13→OP4→OP8). Executing by SLMS process order is appropriate when the scheduling of the SLMS processes across the OS threads is not deterministic. For instance, an example of non-deterministic scheduling occurs when SLMS process P2 is scheduled to OS thread 2 and SLMS process P6 is scheduled to OS thread 1 in one run, but in another run SLMS process P2 is scheduled to OS thread 1 and SLMS process P6 is scheduled to OS thread 2.

Once the deferred sequential execution phase 406 is completed and there are SMLS processes to be executed, the SLMS enters another scheduling phase 402 and the process starts again.

Figure 5:
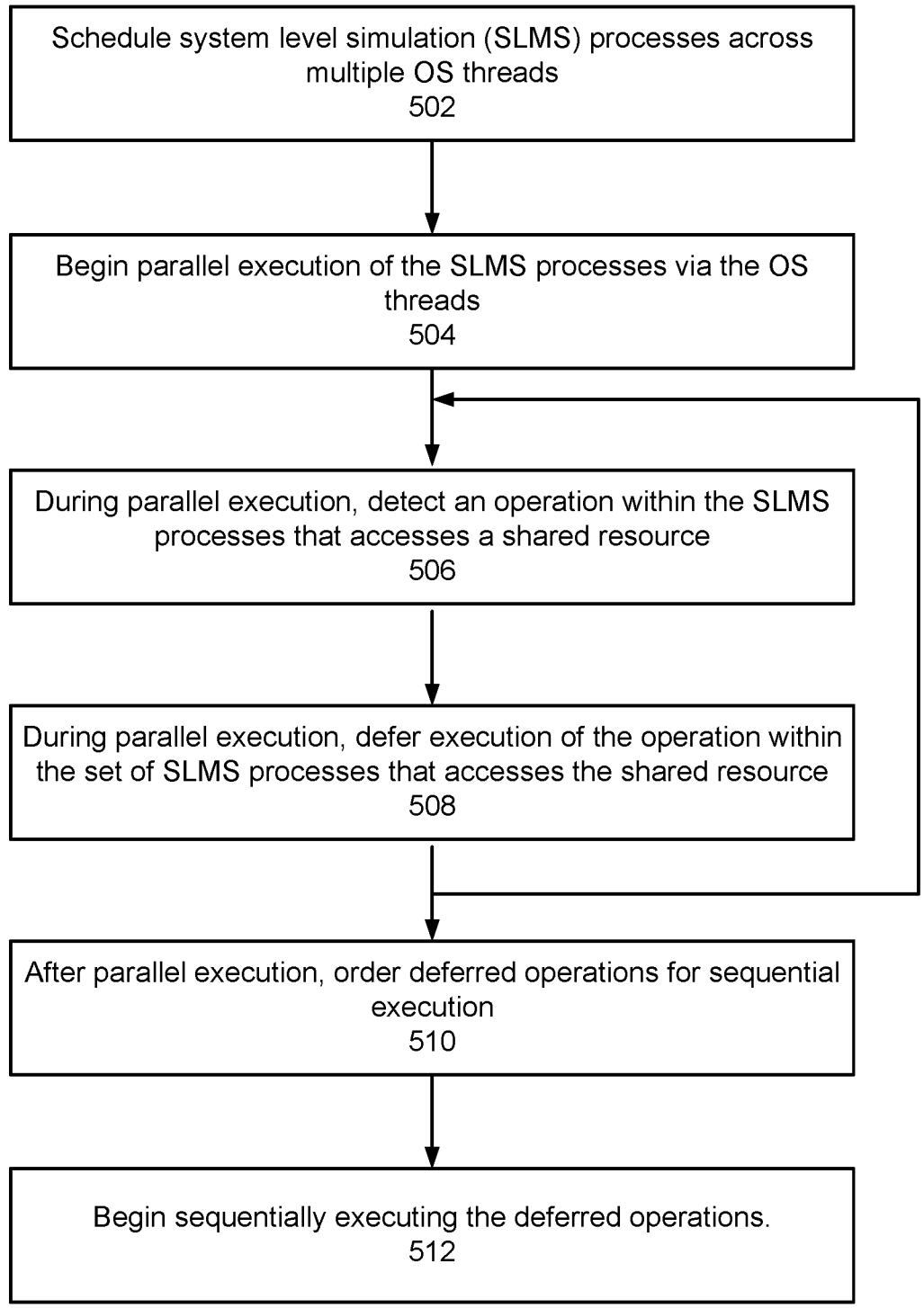
FIG. 5 is a flowchart of a process for deferred execution performed in the host system of FIG. 2, in accordance with an embodiment of the present disclosure.

FIG. 5 is a flowchart of a process for deferred execution performed in the host system 200 of FIG. 2, in accordance with an embodiment of the present disclosure. In step 502, the process scheduler module 234 schedules multiple SLMS processes across multiple OS threads 212. In step 504, the process scheduler module 234 begins parallel execution of the SLMS processes on the processor cores 204 via the OS threads 212. The scheduled SLMS processes then begin executing in parallel. During parallel execution the process scheduler module 234 can continue to exert control over the process execution. In step 506, during parallel execution, the deferred execution module 232 detects an operation within the SLMS processes that accesses a shared resource 236 as the operation is reached. In step 508, the deferred execution module 232 defers the operation until after the parallel execution phase is completed. In other embodiments, the operation accessing a shared resource 236 may not be deferred if the shared resource 236 is of the type for which accesses cannot deferred. The process of detecting and deferring operations that access a shared resource can occur several times until parallel execution is completed.

In step 510, after parallel execution is complete, the deferred execution module 232 orders the deferred operations for sequential execution. As previously explained, the deferred operations can be ordered in OS thread 212 order or SLMS process order. In step 512, the deferred execution module 232 begins sequential execution of the deferred operations, and the deferred operations then execute in the order determined in step 510.

Multi-Thread Safe Direct Memory Interface Access

Figure 6:
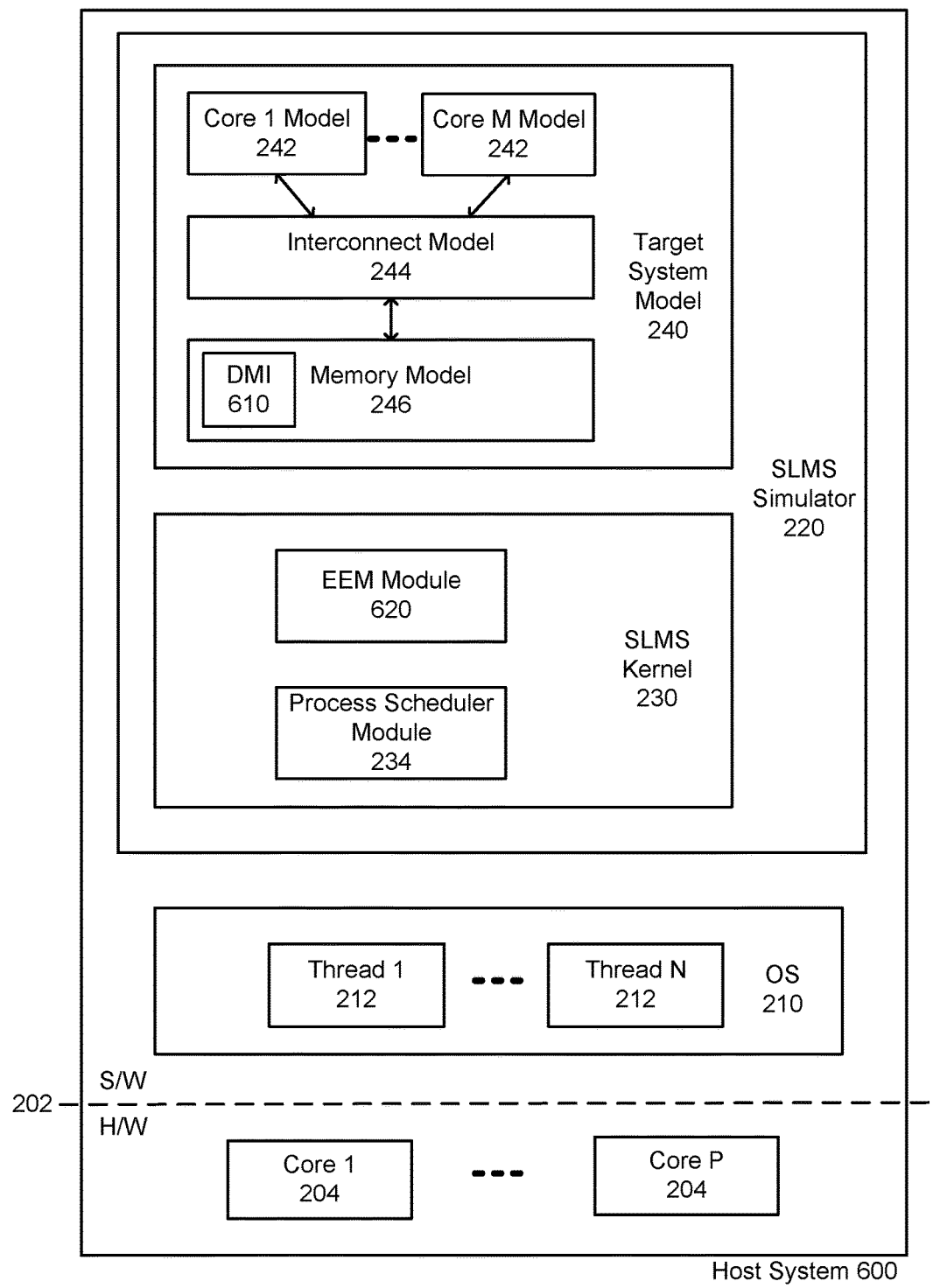
FIG. 6 is a block diagram of a host system configured for performing multi-thread safe SLMS of a target system using multi-thread safe direct memory interface (DMI) access, in accordance with an embodiment of the present disclosure.

FIG. 6 is a block diagram of a host system 600 configured for performing multi-thread safe SLMS of a target system using multi-thread safe direct memory interface (DMI) access, in accordance with an embodiment of the present disclosure. The host system 600 of FIG. 6 is similar to the host system 200 of FIG. 2, but now includes an exclusive execution mode (EEM) module 620 and a DMI module 610.

The processor core models 242, or more specifically the SLMS processes representing the functional behaviors of the processor cores, can access data in the memory models 246 through the interconnect model 244. For example, a SLMS process corresponding to processor core 1 model 242 can request data by calling a function of the interconnect model 244. The interconnect model 244 then calls a function of the memory model 246 to retrieve the data. The data is then returned to the SLMS process corresponding to processor core 1 model 242.

Alternatively, the SLMS process corresponding to processor core 1 model 242 can access the memory model 246 through DMI access. DMI access allows the SLMS process to bypass the interconnect model 244 during simulation and to directly access a region of the memory model 246. One implementation of DMI is defined by the IEEE Std. 1666-2011. Simulating a DMI access is much faster than simulating a memory access that uses the interconnect model 244 because the interconnect logic does not need to be simulated during a DMI access. However, current implementations of DMI in a multi-threaded simulation are problematic because of potential data races between different SLMS processes, for example, when issuing or invalidating a DMI handle.

The DMI module 610 handles DMI access requests from SLMS processes and grants DMI access to the SLMS processes. In one embodiment, a SLMS process requests DMI access by requesting a DMI handle. A DMI handle represents the right to directly access a region of memory and includes information describing the memory access. In one embodiment, the DMI handle may include a DMI pointer (e.g., a pointer to the region of memory) and a DMI descriptor (e.g., the start address and end address of the region of memory, timing information for reading and writing the region of memory, and the type of access granted (read/write)). The DMI module 610 creates the DMI handle and returns the DMI handle to the SLMS process requesting the DMI handle. In one embodiment, creating a DMI handle can include filling an empty DMI handle provided by a SLMS process. In other embodiments, creating a DMI handle can include generating a brand new DMI handle.

The EEM module 620 places a SLMS process into EEM when a request for DMI access is detected. The EEM prevents a SLMS process from being executed in parallel with other SLMS processes. In one embodiment, placing a SLMS process into EEM suspends execution of the SLMS process until all other SLMS processes scheduled for parallel execution are completed, after which the SLMS process is executed exclusively (i.e., by itself). In other embodiments, all other SLMS processes are suspended immediately, or only SLMS processes that are already executing are allowed to complete executing, upon which the SLMS process in EEM can be executed exclusively. In one embodiment, the EEM module 620 may also place a SLMS process into EEM under other conditions, such as conditions that will be described with respect to guarded memory access.

Figure 7:
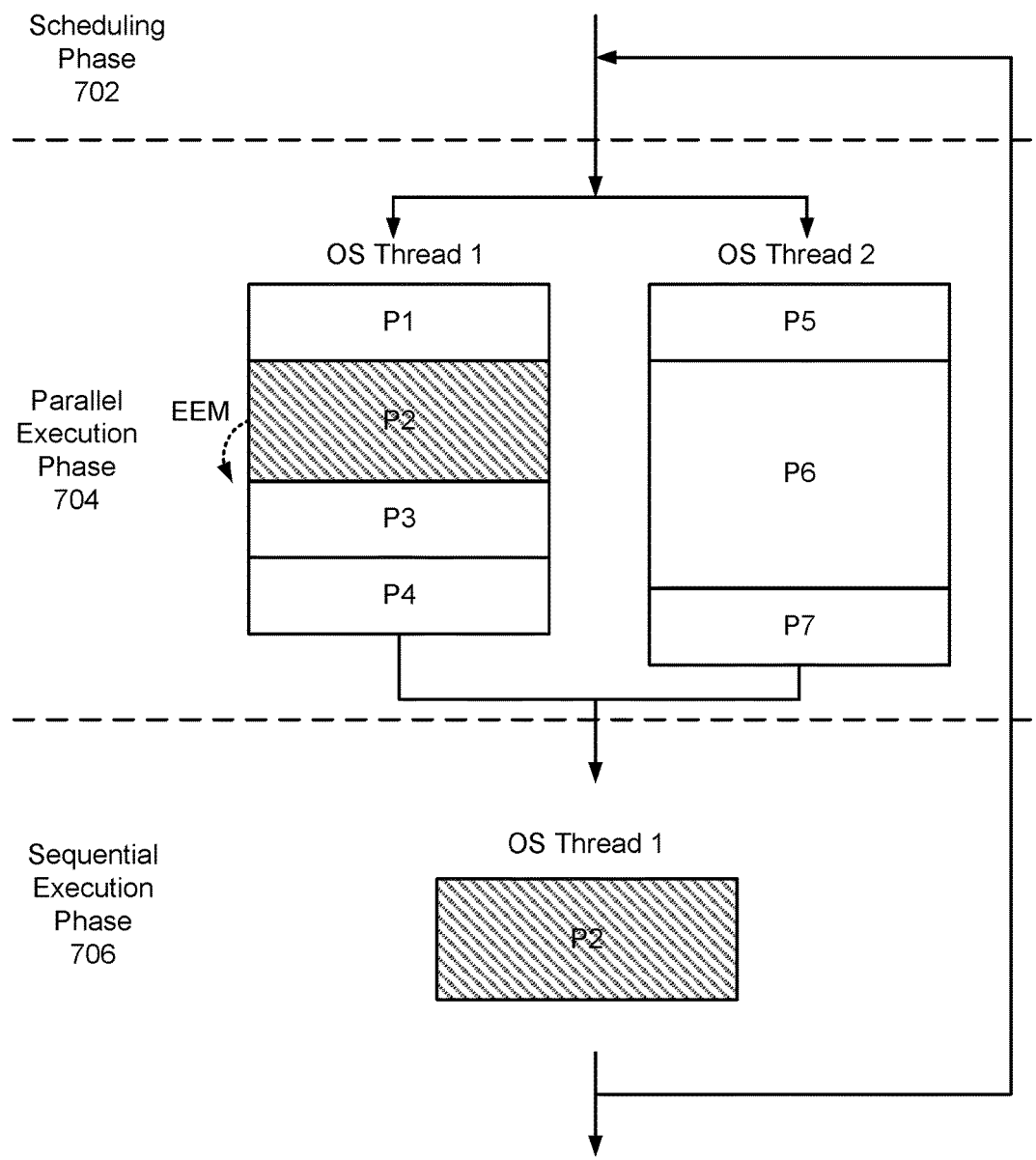
FIG. 7 is a diagram illustrating phases of process execution and the effect of exclusive execution mode (EEM) on the phases of process execution, in accordance with an embodiment of the present disclosure.

FIG. 7 is a diagram illustrating phases of SLMS process execution and the effect of exclusive execution mode (EEM) on the phases of SLMS process execution, in accordance with an embodiment of the present disclosure. The diagram shows three different phases during a SLMS: a scheduling phase 702, a parallel execution phase 704, and a sequential execution phase 706. During the scheduling phase 702, the process scheduler module 234 schedules SLMS processes across the OS threads 212. As shown, there are seven SLMS processes P1-P7 scheduled across OS thread 1 and OS thread 2.

During the parallel execution phase 704, the SLMS processes begin executing in parallel according to their scheduled order across the OS threads 212. As the SLMS processes are executing in parallel, the EEM module 620 places SLMS process P2 into EEM, which suspends execution of SLMS process P2. The other SLMS processes (P1, P3-P7) still execute until they are completed, at which point the parallel execution phase 704 is complete. As previously explained, in some embodiments placing P2 into EEM immediately suspends all other SLMS processes, or only SLMS processes that are already executing (e.g., P5) are allowed to complete executing. In one embodiment, SLMS process P2 is placed into EEM when it requests DMI access to the memory model 246.

The sequential execution phase 706 follows the parallel execution phase 704. SLMS process P2, which is in EEM, is now executed exclusively such that no other SLMS processes are executed in parallel with SLMS processes P2. There may be other SLMS processes that are executed before or after SLMS process P2 during the sequential execution phase 706, but no SLMS processes are executed in parallel with SLMS process P2. Exclusive execution of SLMS process P2 thus ensures that SLMS process P2 is the only SLMS process that can access the memory model 246 when it is executing.

Figure 8:
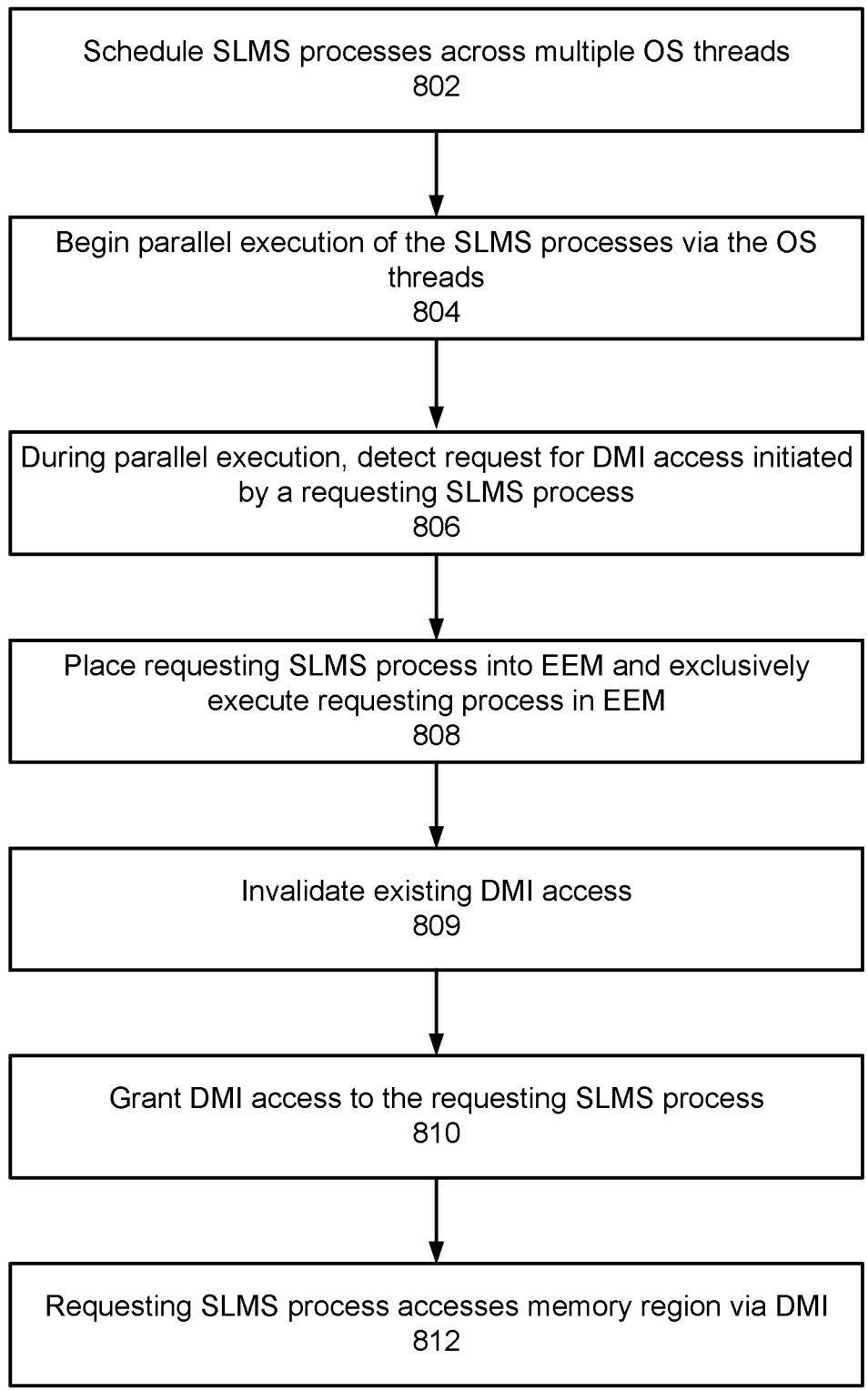
FIG. 8 is a flowchart of a process for memory access using multi-thread safe DMI performed in the host system of FIG. 6, in accordance with an embodiment of the present disclosure.

FIG. 8 is a flowchart of a process for memory access using multi-thread safe DMI performed in the host system 600 of FIG. 6, in accordance with an embodiment of the present disclosure. In step 802, the process scheduler module 234 schedules multiple SLMS processes across multiple OS threads 212. In step 804, the process scheduler module 234 begins parallel execution of the SLMS processes on the processor cores 204 via the OS threads 212. The scheduled SLMS processes then begin executing in parallel.

In step 806, during the parallel execution phase 704, the DMI module 610 detects a request for DMI access initiated by a requesting SLMS process. For example, the requesting SLMS process can be a SLMS process that represents the behavior of processor core 1 (and corresponds to core 1 model 242). In step 808, the EEM module 620 places the requesting SLMS process into EEM and begins exclusively executing the requesting SLMS process in the sequential execution phase 706.

In step 809, if another SLMS process currently has DMI access to the same memory region for which access was requested in step 806, the existing DMI access is invalidated. Invalidation prevents data races between two or more SLMS processes attempting to access the same memory region via DMI. The existing DMI access is also invalidated while the requesting SLMS process is executing in EEM so that another SLMS process that has the existing DMI access is not interrupted while accessing the memory. In one embodiment, invalidating DMI access can include invalidating one or more existing DMI handle that have been granted to one or more other SLMS processes.

In step 810, once the requesting SLMS process is executed in EEM and existing DMI access to the same memory region has been invalidated, the DMI module 610 grants DMI access to the requesting SLMS process. Granting DMI access in one embodiment includes creating a DMI handle and then returning the DMI handle to the requesting SLMS process. The DMI handle is created while the requesting SLMS process is executing in EEM, because race conditions in granting and invalidating DMI access must be avoided to be multi-thread safe. Executing a SLMS process in EEM ensures that only one DMI access request is processed at a time to prevent race conditions between multiple DMI requests. In step 812, the requesting SLMS process then accesses the memory model 246 using DMI. The SLMS process may access the memory model 246 using DMI during the parallel phase of execution 704 or during the sequential phase of execution 706.

Figure 9:
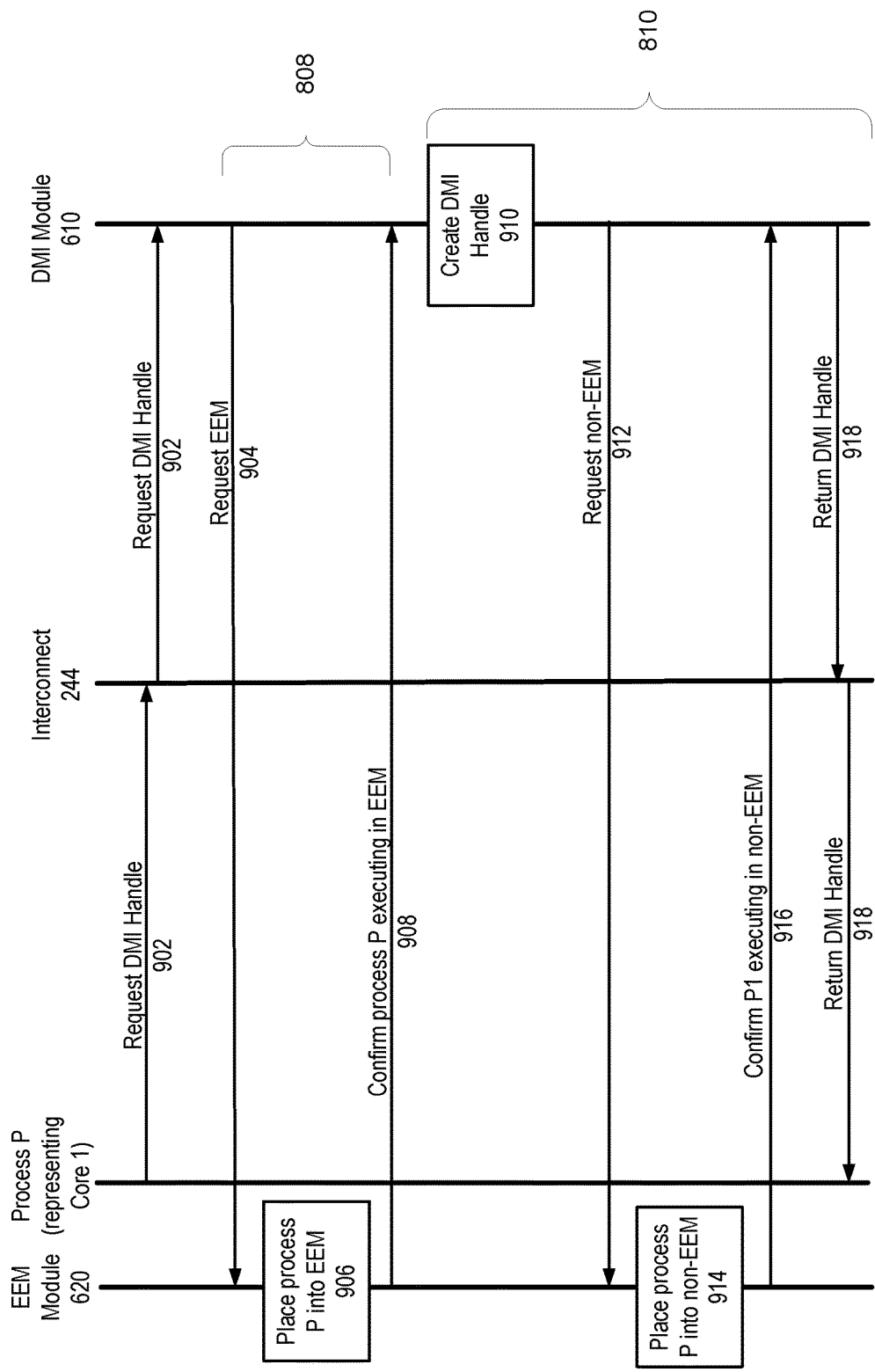
FIG. 9 is an interaction diagram for granting DMI access, in accordance with an embodiment of the present disclosure.

FIG. 9 is an interaction diagram illustrating how DMI access is granted in greater detail, in accordance with an embodiment of the present disclosure. Specifically, the inter-action diagram illustrates steps 806, 808 and 810 of FIG. 8 in more detail. The interaction diagram includes interactions between the EEM module 620, the SLMS process P, the interconnect model 244, and the memory model 246. SLMS process P represents the functional behavior of processor core 1 and corresponds to the core 1 model 242.

Initially, there may be many SLMS processes executing in parallel during the parallel execution phase. SLMS process P then requests 902 a DMI handle from the interconnect model 244 and the request is forwarded to the DMI module 610 within the memory model 246. In one embodiment, the request 902 for a DMI handle represents a DMI access request.

The DMI module 610 requests 904 that SLMS process P be placed into EEM upon detecting the DMI handle request. EEM module 620 places 906 SLMS Process P into EEM upon receiving the request, thereby switching SLMS Process P from non-EEM into EEM. When SLMS process P is placed into EEM, it is initially suspended until all other scheduled SLMS processes complete executing. After the other scheduled SLMS processes complete executing, SLMS process P begins executing exclusively in EEM. Once SLMS process P is executing in EEM, EEM module 620 confirms 908 that process P is executing in EEM.

The DMI module 610 creates 910 a DMI handle upon receiving confirmation that SLMS process P is executing in EEM. Once the DMI handle is created, the DMI module 610 requests 912 that SLMS process P be placed into non-EEM. EEM module 620 places 914 SLMS process P into non-EEM upon receiving the request. EEM module 620 also confirms 916 that SLMS process P1 is executing in non-EEM. DMI module 610 then returns 918 the DMI handle to the interconnect model 244, which forwards the DMI handle back to the SLMS process P. SLMS process P uses the DMI handle for performing DMI accesses to the memory model 246 (not shown).

Guarded Memory Access

Figure 10:
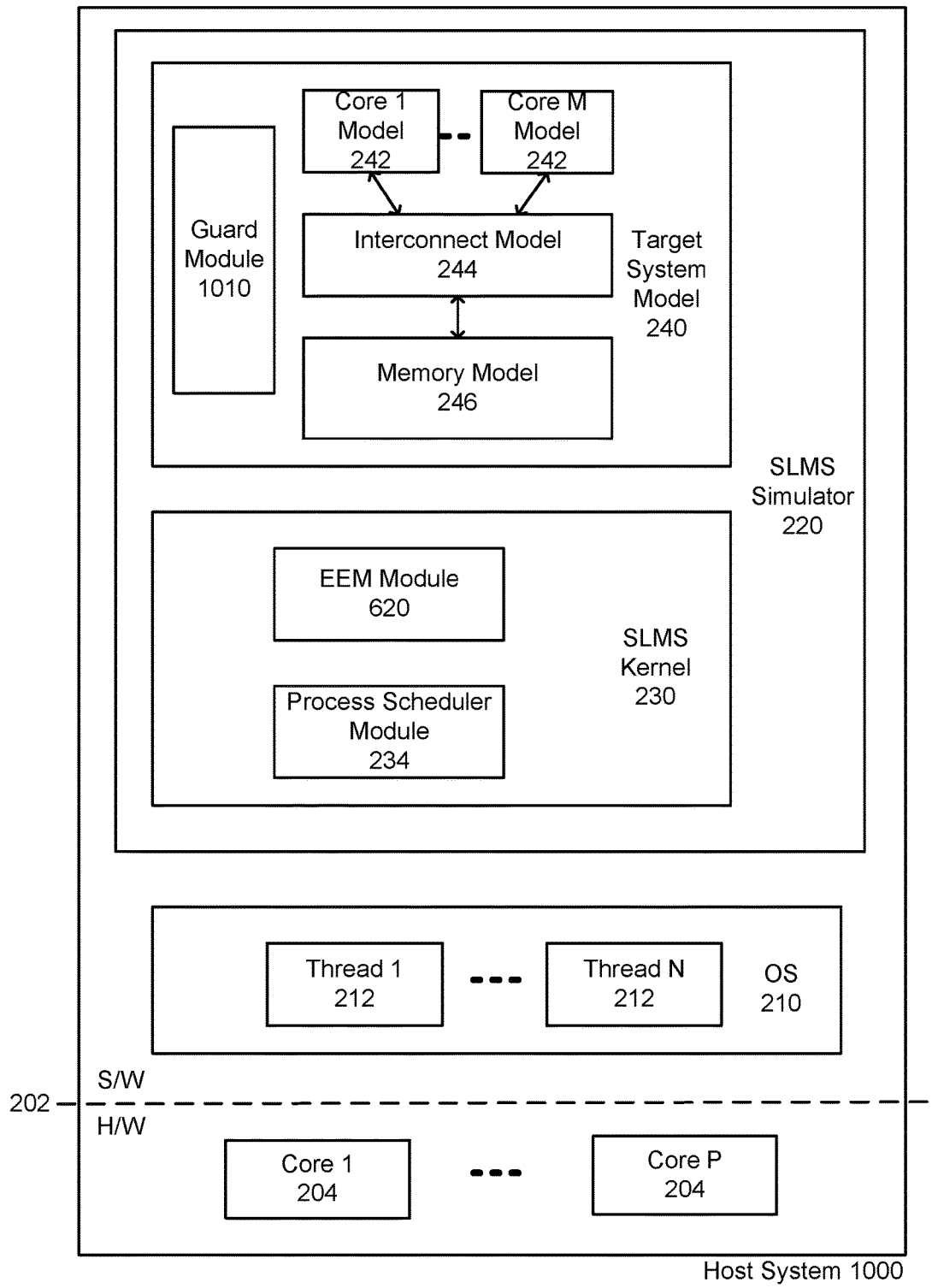
FIG. 10 is a block diagram of a host system configured for performing multi-thread safe SLMS of a target system using guarded memory access, in accordance with an embodiment of the present disclosure.

FIG. 10 is a block diagram of a host system configured for performing multi-thread safe SLMS of a target system using guarded memory access, in accordance with an embodiment of the present disclosure. The host system 1000 of FIG. 10 is similar to the host system 600 of FIG. 6, but now includes a guard module 1010 within the target system model 240. Although not explicitly shown in FIG. 10, the logic of the guard module 1010 may be distributed among the component models of the target system model 240. For example, portions of the guard module 1010 may be included in the processor core models 242, the interconnect model 244, and/or the memory model 246.

The guard module 1010 restricts access to regions (e.g., address ranges) of the memory model 246 that are subject to transient states and are shared between multiple SLMS processes so that only one SLMS process at a time can access the region. A memory region is in a transient state if the data in the memory region has been accessed for modification, but the modified data has not yet been written back into the memory region. Specifically, the guard module 1010 sets a memory region into guarded mode when the SLMS processes are planning on executing operations on the memory region that lead to transient memory states. The guarded mode indicates that the memory region should be locked when it is accessed. When these guarded memory regions are accessed, a guard lock is acquired from the guard module 1010 by the SLMS process that intends to access the guarded memory region. The guard lock ensures that only one SLMS process at a time can access the locked memory region.

Figure 11A:
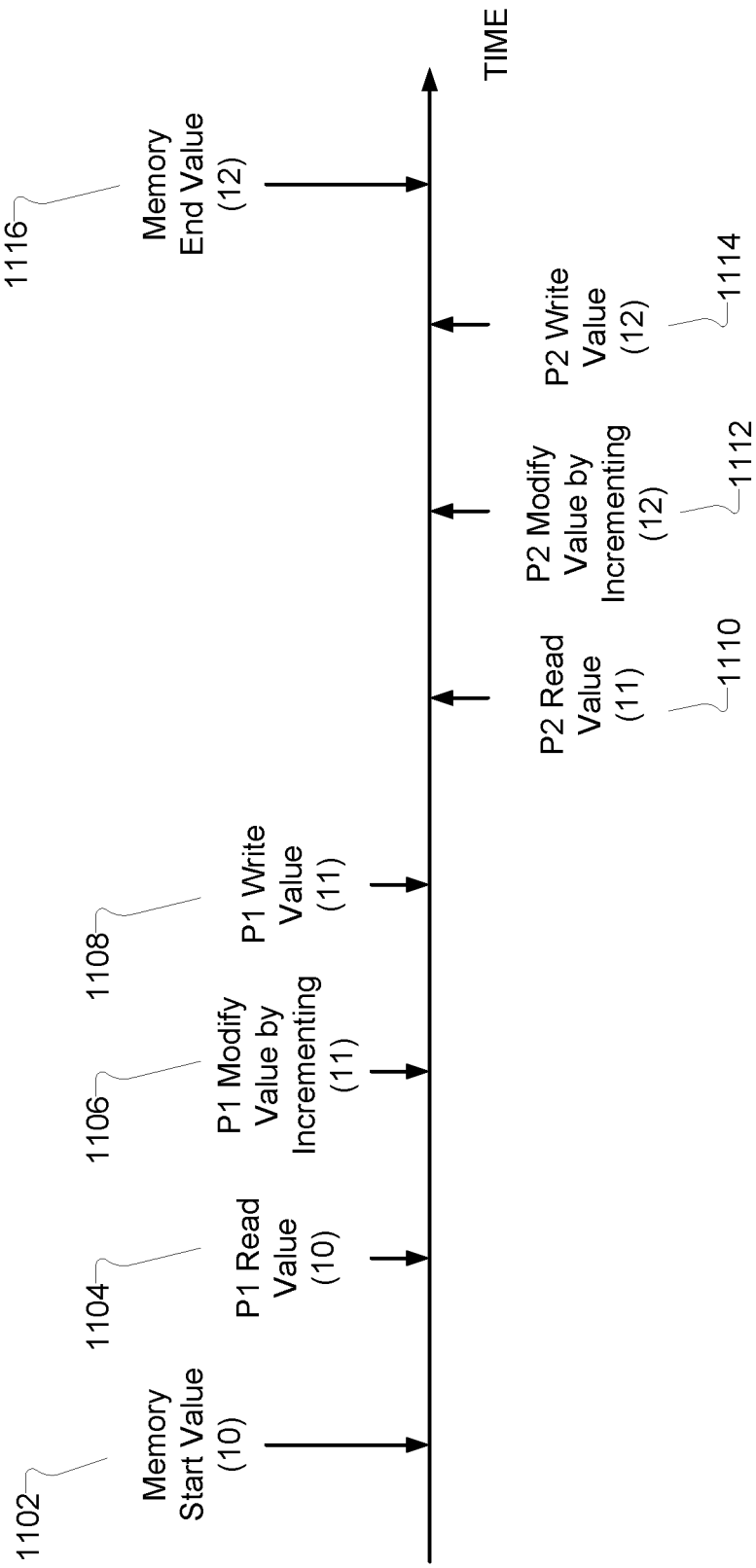
FIG. 11A is a timeline illustrating a possible, and correct, ordering of operations during two READ-MODIFY-WRITE operations of separate SLMS processes.

Locking a memory region prevents transient states from causing variations in the SLMS simulation results from one run to the next. Transient states are now explained by reference to FIG. 11A and 11B. FIG. 11A is a timeline illustrating a possible, and correct, ordering of two READ-MODIFY-WRITE operations of separate SLMS processes. A READ-MODIFY-WRITE operation reads a value from memory model 246, modifies the value, and then writes the value back to the memory model 246. READ-MODIFY-WRITE operations may sometimes be referred to as atomic operations.

The timeline in FIG. 11A shows two READ-MODIFY-WRITE operations performed sequentially by SLMS process P1 and SLMS process P2. SLMS process P1 represents the functional behavior of processor core 1 and SLMS process P2 represents the functional behavior of processor core 2. Initially, the memory value is 10 at 1102. SLMS process P1 performs a READ at 1104, a MODIFY at 1106, and a WRITE at 1108, storing a value of 11. SLMS process P2 thereafter performs a READ at 1110, a MODIFY at 1112, and a WRITE at 1114, storing a value of 12. Because the operations performed by SLMS process P1 and SLMS process P2 were sequentially performed, the ending value at point 1116 is 12.

Figure 11B:
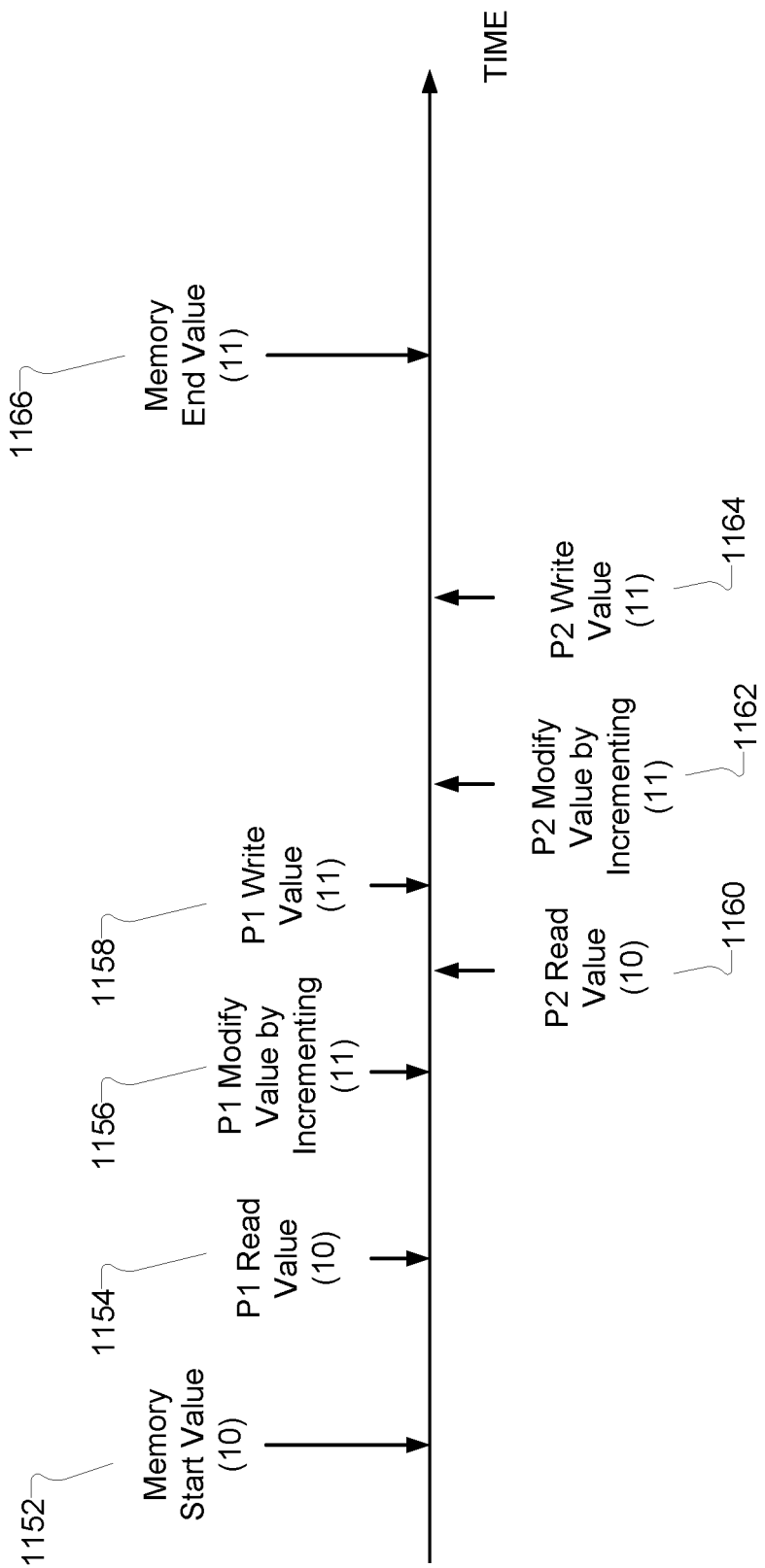
FIG. 11B is a timeline illustrating another possible, and incorrect, ordering of operations during two READ-MODIFY-WRITE operations of separate SLMS processes.

On the other hand, FIG. 11B is a timeline illustrating another possible, and incorrect, ordering of two READ-MODIFY-WRITE operations of separate SLMS processes. Initially, the memory value is 10 at 1152. SLMS process P1 performs a READ at 1154, a MODIFY at 1156, and a WRITE at 1158, storing a value of 11. In parallel with SLMS process P1, SLMS process P2 performs a READ at 1160, a MODIFY at 1162, and a WRITE at 1164, storing a value of 11. Because the operations performed by SLMS process P1 and SLMS process P2 were performed in parallel, the ending value at point 1166 is 11.

As shown by the timelines in FIG. 11A and FIG. 11B, the memory region storing the value is in a transient state between the time SLMS process P1 reads the value and the time the modified value is written back to the memory region. The ending value stored in the memory region thus depends on the timing of the two READ-MODIFY-WRITE operations performed by SLMS process P1 and SLMS process P2. Acquiring a guard lock for this memory region prevents any intervening accesses to the memory region while in a transient state and creates consistency in the SLMS results across different simulation runs.

Figure 12:
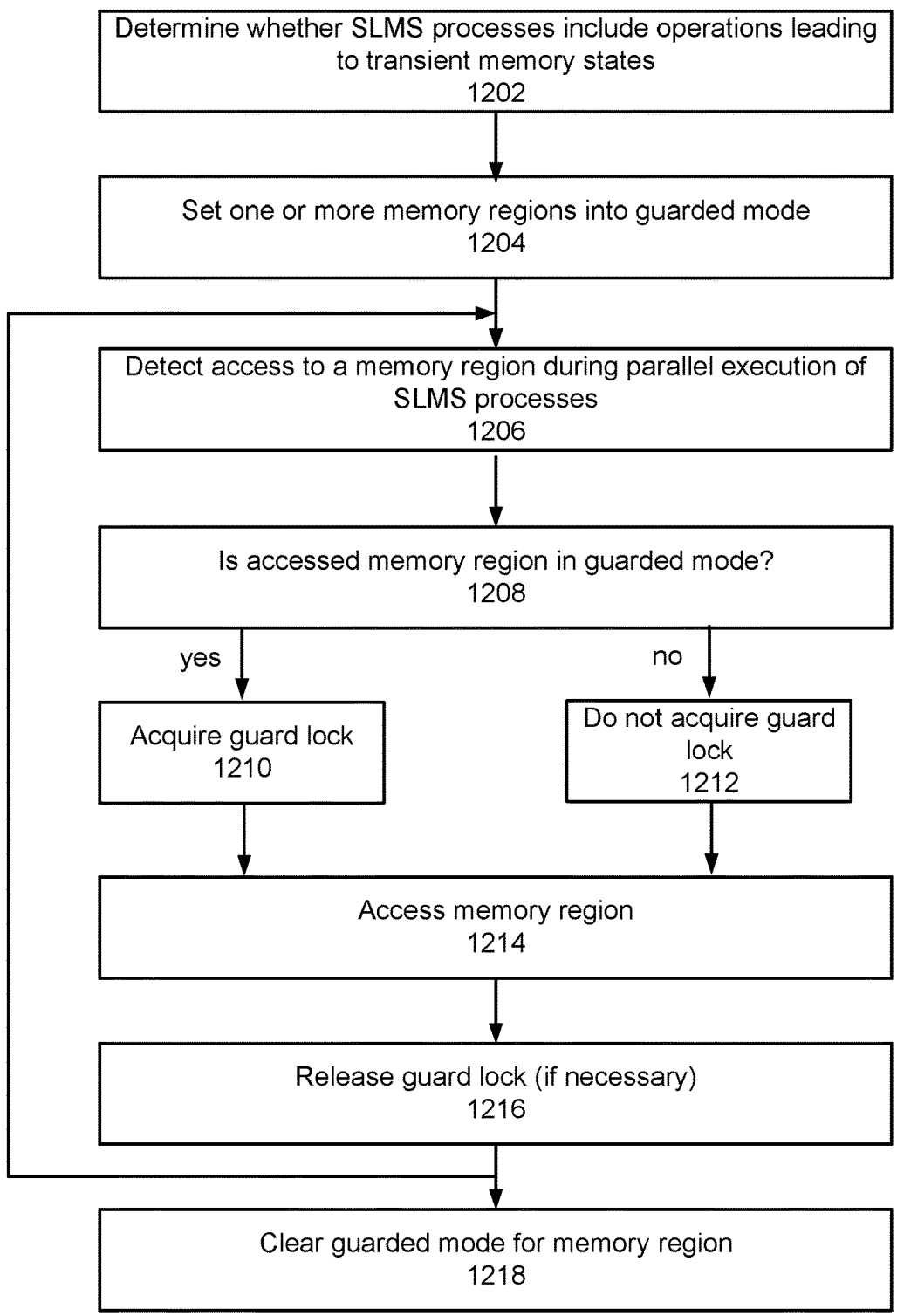
FIG. 12 is a flowchart of a process for memory access using guarded memory access performed in the host system of FIG. 10, in accordance with an embodiment of the present disclosure.

FIG. 12 is a flowchart of a process for memory access using guarded memory access performed in the host system 1000 of FIG. 10, in accordance with an embodiment of the present disclosure. In step 1202, the guard module 1010 determines whether any SLMS processes to be executed during a parallel phase of execution include operations that lead to transient memory states and the location of the memory region that will be subject to transient states. Examples of such operations include READ-MODIFY-WRITE operations, as explained in conjunction with FIG. 11A and 11B. In one embodiment, placing a memory region into guarded mode is done on demand from SLMS processes. From the software that is running on the processor core models 242, the guard module 1010 can determine which memory regions are shared and will be subject to transient states.

If there are operations leading to transient states, in step 1204, the guard module 1010 places one or more memory regions that are shared and will be accessed by those operations into guarded mode. The guarded mode indicates that the memory region is shared and is subject to transient states and should only be accessed by one SLMS process at a time. Steps 1202 and 1204 can occur prior to the SLMS processes being executed in parallel. In other embodiments, steps 1202 and 1204 can occur while the SLMS processes are being executed in parallel.

In step 1206, as the SLMS processes are executing in parallel during a parallel phase of execution, a SLMS process attempts to access a memory region and the guard module 1010 detects this memory access. In SYSTEMC terms, the detected memory access may be an interface method call (IMC) that is initiated by a SLMS process that requests memory access through the interconnect model 244. This IMC can be detected by portions of the guard module 1010 that are distributed within the interconnect model 244 or the memory model 246. Alternatively, if the SLMS process accesses the memory model 246 through DMI, the guard module 1010 may detect the DMI access before any data is transferred via DMI. The DMI access can be detected by portions of the guard module 1010 that are distributed within the processor core models 242.

In step 1208, the guard module 1010 determines if the accessed memory region is in guarded mode. If the memory region is in guarded mode, in step 1210, the guard module 1010 acquires a guard lock for the memory region. The guard lock allows only a single SLMS process to access the memory region while the guard lock is held. On the other hand, if the memory region is not in guarded mode, in step 1212, the guard module 1010 does not acquire a guard lock for the memory region because the memory region is not at risk of being in a transient state, or is not being shared.

In step 1214, the SLMS process accesses the memory region. If a guard lock was previously acquired in step 1210, the memory access occurs while the lock is held. If a lock was not acquired as in step 1212, the memory access occurs without any lock being held.

In step 1216, the guard lock is released if a guard lock was previously acquired for the memory region in step 1210. In one embodiment, guard locks are not kept across SLMS process invocations. A SLMS process invocation is a single execution of a SLMS process (i.e., between resuming and suspending the SLMS process). This is to avoid deadlock in the simulation. As an example, a deadlock may occur when two SLMS processes are each holding a guard lock and are waiting for the guard lock held by the other SLMS process to be released.

The SLMS processes may iterate and repeat at step 1206 to detect another access to a memory region. In step 1218 the guard module 1010 clears the guarded mode once the memory region no longer needs to be guarded. For example, the guarded mode may be cleared if the execution of SLMS processes is switched from a parallel phase of execution into a sequential phase of execution where transient states are no longer relevant. The guarded mode also may be cleared when the software being simulated in the target system causes the operations in the SLMS processes to change such that they no longer access the memory region in a way that causes transient state, or when the memory region is no longer shared.

In one embodiment, the EEM is used during the transition from non-guarded mode into guarded mode and back. For instance, when transitioning to guarded mode, the EEM module 620 temporarily places a SLMS process that includes transient operations into EEM. Once the SLMS process is confirmed to be executing in EEM, the guard module 1010 places a memory region into guarded mode. Placing the memory region into guarded mode while executing a SLMS process in EEM prevents data races, for example, if one SLMS process wants to place a memory region into guarded mode and another SLMS process wants to clear the guarded mode for the memory region.

Additional Configuration Considerations

In one embodiment, the deferred execution module 232, the DMI module 610, the EEM module 620, and the guard module 1010 may all reside within the same host system. A single SLMS can thus use deferred execution, multi-thread safe DMI access, and/or guarded memory access to simulate in a multi-thread safe manner.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by a plurality of processors cores, e.g., processor 102, that are temporarily configured (e.g., by software) or permanently configured to perform the relevant operations. Whether temporarily or permanently configured, such processor cores may constitute processor-implemented modules that operate to perform one or more operations or functions. The modules referred to herein may, in some example embodiments, comprise processor-implemented modules.

The plurality of processor cores may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the plurality of processor cores, not only residing within a single machine, but deployed across a number of machines. In some example embodiments, the plurality of processor cores or processor-implemented modules may be located in a single geographic location (e.g., within a home environment, an office environment, or a server farm). In other example embodiments, the plurality of processor cores or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for a multi-thread safe system level modeling simulation that enables the simulation results to be reproducible across simulation runs through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for multi-thread system level modeling simulation (SLMS) of a target system on a host system, the target system having a plurality of processor core models that access a memory model of the target system, the method comprising:
   setting a memory region of the memory model of the target system into guarded mode indicating that the memory region should be locked when the memory region is accessed by one of a plurality of SLMS processes, the plurality of SLMS processes representing functional behaviors of the processor core models;
   identifying an access to the memory region by an accessing SLMS process of the plurality of SLMS processes via an interconnect model of the target system, the interconnect model connecting the processor core models to the memory model; and
   responsive to the access to the memory region and the memory region being in the guarded mode, acquiring a guard lock for the memory region that allows the accessing SLMS process to access the memory region via the interconnect model while the guard lock is acquired, and wherein the plurality of SLMS processes cannot access the memory region while the guard lock is acquired.

2. The method of claim 1, further comprising:
   accessing, by the accessing SLMS process, the memory region via the interconnect model while the guard lock is acquired for the memory region.

3. The method of claim 1, further comprising:
   determining whether at least one of the operations in the plurality of SLMS processes leads to a transient state in the memory region,
   wherein the memory region is set into guarded mode responsive to determining that at least one of the operations in the plurality of SLMS processes leads to the transient state in the memory region.

4. The method of claim 3, wherein an operation leads to transient state in the memory region if the operation is a read-modify-write operation.

5. The method of claim 1, wherein setting the memory region into guarded mode comprises:
   generating, by a requesting SLMS process of the SLMS processes, a request to set the memory region into guarded mode; and
   responsive to the request, setting the memory region into guarded mode while the requesting SLMS process executes exclusively in exclusive execution mode.

6. The method of claim 1, wherein the SLMS processes are executed in parallel via a plurality of threads, and the access to the memory region is identified during the parallel execution.

7. The method of claim 1, wherein the is a multi-threaded SystemC simulation and the SLMS processes are SystemC processes.

8. A non-transitory machine readable medium storing processor executable instructions for multi-thread system level modeling simulation (SLMS) of a target system on a host system, the target system having a plurality of processor core models that access a memory model of the target system, the instructions when executed by the host system cause the host system to perform operations comprising:
   setting a memory region of the memory model of the target system into guarded mode indicating that the memory region should be locked when the memory region is accessed by one of a plurality of SLMS processes, the plurality of SLMS processes representing functional behaviors of the processor core models;
   identifying an access to the memory region by an accessing SLMS process of the plurality of SLMS processes via an interconnect model of the target system, the interconnect model connecting the processor core models to the memory model; and
   responsive to the access to the memory region and the memory region being in the guarded mode, acquiring a guard lock for the memory region that allows the accessing SLMS process to access the memory region via the interconnect model while the guard lock is acquired, and wherein the plurality of SLMS processes cannot access the memory region while the guard lock is acquired.

9. The non-transitory machine readable medium of claim 8, the operations further comprising:
   accessing, by the accessing SLMS process, the memory region via the interconnect model while the guard lock is acquired for the memory region.

10. The non-transitory machine readable medium of claim 8, the operations further comprising:
   determining whether at least one of the operations in the plurality of SLMS processes leads to a transient state in the memory region, wherein the memory region is set into guarded mode responsive to determining that at least one of the operations in the plurality of SLMS processes leads to the transient state in the memory region.

11. The non-transitory machine readable medium of claim 10, wherein an operation leads to transient state in the memory region if the operation is a read-modify-write operation.

12. The non-transitory machine readable medium of claim 8, wherein setting the memory region into guarded mode comprises:
   generating, by a requesting SLMS process of the SLMS processes, a request to set the memory region into guarded mode; and
   responsive to the request, setting the memory region into guarded mode while the requesting SLMS process executes exclusively in exclusive execution mode.

13. The non-transitory machine readable medium of claim 8, wherein the SLMS processes are executed in parallel via a plurality of threads, and the access to the memory region is identified during the parallel execution.

14. The non-transitory machine readable medium of claim 8, wherein the simulation is a multi-threaded SystemC simulation and the SLMS processes are SystemC processes.

15. A system comprising:
   at least one processor; and
   a non-transitory machine readable medium storing processor executable instructions for multi-thread system level modeling (SLMS) of a target system on a host system, the target system having a plurality of processor core models that access a memory model of the target system, the instructions when executed by the at least one processor cause the at least one processor to perform operations comprising:
   setting a memory region of the memory model of the target system into guarded mode indicating that the memory region should be locked when the memory region is accessed by one of a plurality of SLMS processes, the plurality of SLMS processes representing functional behaviors of the processor core models;
   identifying an access to the memory region by an accessing SLMS process of the plurality of SLMS processes via an interconnect model of the target system, the interconnect model connecting the processor core models to the memory model; and
   responsive to the access to the memory region and the memory region being in the guarded mode, acquiring a guard lock for the memory region that allows the accessing SLMS process to access the memory region via the interconnect model while the guard lock is acquired, and wherein the plurality of SLMS processes cannot access the memory region while the guard lock is acquired.

* * * * *

UNITED STATES PATENT AND TRADEMARK OFFICE
CERTIFICATE OF CORRECTION

PATENT NO.        : 10,248,581 B2
APPLICATION NO.   : 15/729337
DATED             : April 2, 2019
INVENTOR(S)       : Jan M. J. Janssen et al.

Page 1 of 1

It is certified that error appears in the above-identified patent and that said Letters Patent is hereby corrected as shown below:

In the Claims

Column 19, Line 16, Claim 7, after "wherein the" insert --simulation--.

Signed and Sealed this
Tenth Day of September, 2019

Andrei Iancu
*Director of the United States Patent and Trademark Office*